INVENTORS
EDWARD R. BLANCHARD
DONALD L. SMITH
BY
Jonathan Blank
ATTORNEY

United States Patent Office 3,363,427
Patented Jan. 16, 1968

3,363,427
PRODUCTION OF ULTRAHIGH PURITY OXYGEN WITH REMOVAL OF HYDROCARBON IMPURITIES
Edward R. Blanchard, Summit, and Donald L. Smith, Berkeley Heights, N.J., assignors to Air Reduction Company, Incorporated, New York, N.Y., a corporation of New York
Filed June 2, 1964, Ser. No. 371,917
36 Claims. (Cl. 62—21)

This invention relates in general to the purification of gases, and more particularly, to methods and apparatus for producing oxygen of ultrahigh purity grades.

The maximum purity of oxygen produced by the usual methods is about 99.8 percent. There are certain types of applications, however, such as for fuel cells and the like, where even small quantities of residual impurities could accumulate to the detriment of the efficiency of the process. However, when it is attempted to obtain oxygen of substantially higher purities, say up to about 99.998 percent, by commercially feasible methods and in commercial quantities, certain problems arise. Using a conventional rectification column, it is impossible to ultimately recover more than 10 or 15 percent of the oxygen from the feed gas. Moreover, alternative methods using high vacuum equipment have been found to be cumbersome and expensive and not adapted to commercial use.

Accordingly, the general object of this invention is to improve commercial methods and apparatus for obtaining ultrapure gases; and more particularly, to produce oxygen of purities substantially above the usual commercial grades more efficiently and in greater quantities than attainable by prior art processes. Further objects of the invention are to produce ultrapure oxygen in systems maintained at or above atmospheric pressure, by techniques which are inexpensive and readily adapted to commercial use. A specific object of this invention is to obtain oxygen of a purity of at least about 99.998 percent with a recovery rate of better than 90 percent of the oxygen present in the feed stock. Another specific object of the present invention is to obtain oxygen of the above purity by a process auxiliary to the principal purification process.

These and other objects are attained in accordance with the present invention in a system in which oxygen of a commercial grade of purity, in the form of vapor or liquid, or a mixture of the two, includes argon as its principal residual impurity, together with trace amounts of other impurities, such as nitrogen, nitrous oxide, a variety of hydrocarbons, krypton, and xenon. Argon and those impurities having a lower boiling point than oxygen are removed in a rectification column having a large number of plates, wherein the vapor-to-liquid ratio is maintained in excess of 0.700, and preferably, at about 0.9. This operation is carried out by first cooling the feed stock to the saturation point, completely condensing it to liquid in the bottom of the column, and then introducing the liquefied feed stock, after isenthalpic expansion, into the upper portion of the column where the vapor fraction is partially condensed to liquid and flows down together with the liquid fraction through the contact plates in countercurrent with the rising vapor which strips and the lower boiling impurities from the liquid. This partially purified liquid collects in the lower portion of the rectifier column. Higher boiling impurities, such as kryton and xenon are drawn off. The remaining liquid is then completely reboiled by heat exchange with the saturated feed stock undergoing condensation. The ultrapure product is withdrawn from the rectification column as a saturated vapor, at a point just above the reboiler, at a controlled rate which in the preferred embodiment is maintained at about 10 mol percent of the rate of flow of the feed stock into the column. The remaining 90 mol percent of the feed from which the ultrapure product has been withdrawn is returned for recycle, either passing into the feed stream at the entrance to the ultrapure processing system, or passing back into the system as reboil vapor, and returning as part of the feed stock.

Hydrocarbon impurities are removed at different points int he aforesaid cycle in accordance with alternative methods, either by combustion in a catalytic chamber, or as purge liquid from an auxiliary rectification column.

Refrigeration is supplied to various points in each of the disclosed systems by means of an auxiliary liquid nitrogen source, to compensate for heat leak in several of the embodiments, or a nitrogen cycle which merely transfers refrigeration from one point to another in other embodiments, or a combination of the two.

Table I gives the typical composition of a commercial grade of oxygen to be processed in accordance with the present invention; and Table II gives the tentative specification for the composition of the ultrahigh purity oxygen end product of the processes of the present invention.

Table I.—Commercial grade oxygen

| | |
|---|---|
| Oxygen | percent 99.7–99.8 |
| Nitrogen | do <0.001 |
| Argon | do 0.1–0.3 |
| Krypton-Xenon | p.p.m 5–11 |
| Methane | p.p.m 6–16 |
| Other hydrocarbons | p.p.m about 1 |
| Nitrous oxide | p.p.m <0.005–0.57 |

Table II.—Ultrahigh purity oxygen

| | |
|---|---|
| Oxygen | percent 99.998 |
| Hydrocarbons | p.p.m. max 1 |
| Hydrogen | p.p.m. max .05 |
| Nitrogen | p.p.m. max 1 |
| Halogens | p.p.m. max 1 |
| Balance inert gas | p.p.m. max 17.0 |

Particular advantages of the methods and apparatus of the present invention are that they provide for the efficient, inexpensive production of oxygen to a purity of 99.998 percent in commercial quantities. In those systems which are designed to operate separately from the principal rectification system, up to 90, and in some cases, 95 percent of the oxygen in the feed stream is ultimately recovered, at a production rate which may be 30 to as high as 400 standard cubic feet per minute, or better. Moreover, in those embodiments in which the ultrahigh purity apparatus is auxiliary to the principal rectification column, ultrapure oxygen is produced at a rate which is about 10 mol percent of the reboil rate in the main column. These latter arrangements permit auxiliary production of the ultrahigh purity oxygen product without interference with the main production unit, with economy of operation.

Six different embodiments are described in detail hereinafter as illustrations of various alternatives within the scope of the present invention. Of these, the first three described may be operated independently of a conventional oxygen producing column, and are adapted for the further purification of oxygen having a purity of about 99.7 percent. In these embodiments, a recycle is employed to recover about 95 percent of the feed stock.

The remaining three embodiments are designed to supplement commercial rectification plants. In these embodiments, the main commercial column provides the recycle. In such systems, up to about 40 percent of the oxygen product can be produced as ultrahigh purity oxygen, the remainder being produced as commercial grade oxygen of about 99.7 percent purity.

Other objects, features and advantages will be apparent to those skilled in the art from a detailed study of the specification hereinafter with reference to the attached drawings, in which:

FIGURE 1 is a schematic showing of the simplest embodiment of the present invention, designed to operate independently of a commercial rectification plant to repurify gaseous oxygen having an initial purity of about 99.7 percent. Here, hydrocarbon impurities are removed by catalytic combustion; and liquid nitrogen supplies refrigeration from an external source.

FIGURE 2 is a schematic showing of an embodiment similar to that of FIGURE 1, designed to operate either in addition to or separate from a commercial plant to repurify oxygen which is introduced to the system as a liquid about 99.7 percent pure. A nitrogen cycle conserves refrigeration, which is supplemented from an external liquid nitrogen source. As above, hydrocarbons are removed by catalytic combustion.

FIGURE 3 is a schematic showing of an embodiment substantially similar to that of FIGURE 2, except that the hydrocarbon impurities are removed by rectification.

FIGURE 4 is a schematic showing of an embodiment of the present invention which is designed as an addition to a commercial plant, the feed being oxygen vapor derived from the commercial plant reboiler at a purity of about 99.7 percent. Here hydrocarbon impurities are removed by catalytic combustion; and liquid nitrogen from an auxiliary source supplies auxiliary refrigeration.

Figure 5:
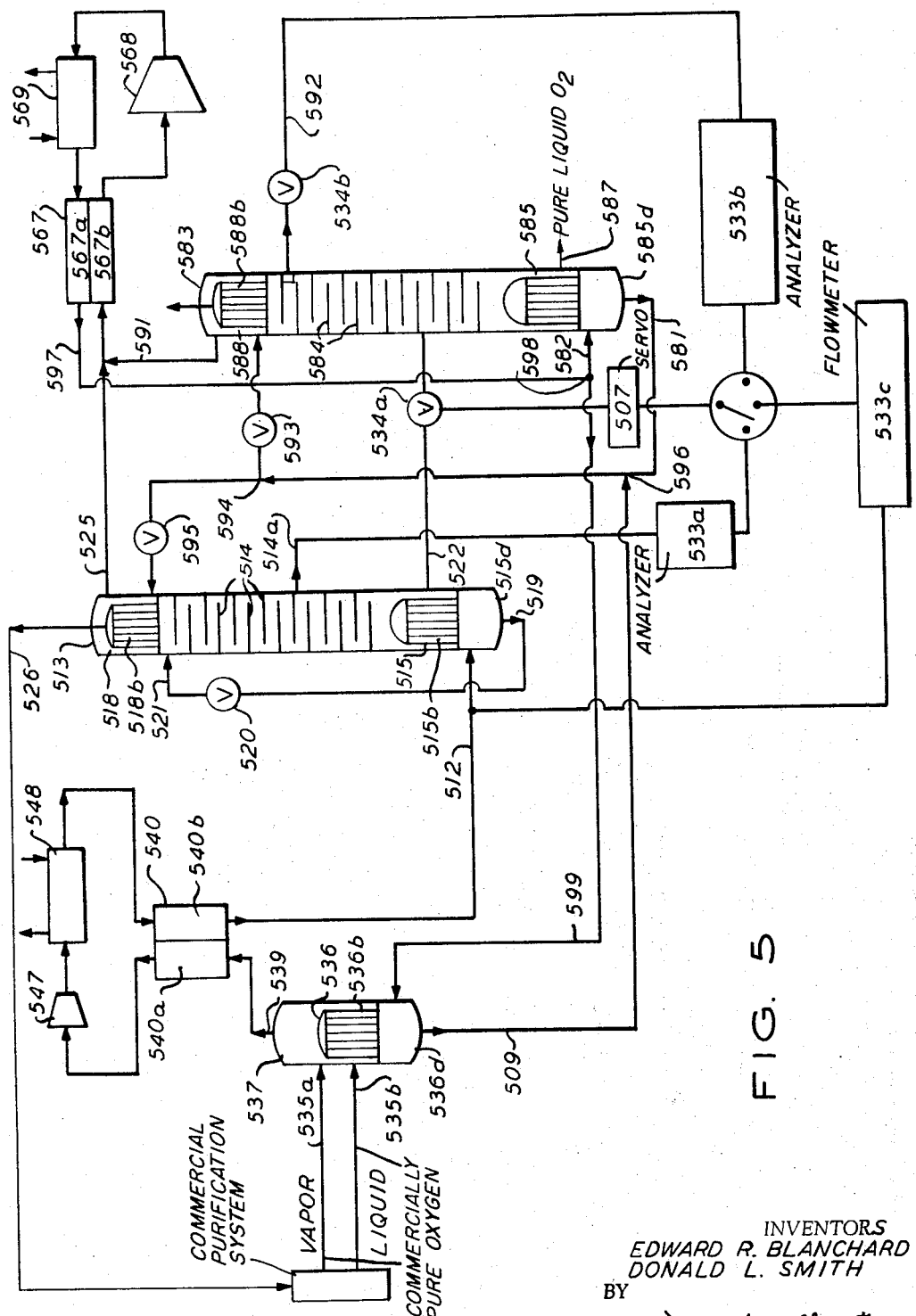

FIGURE 5 is a schematic showing of a preferred embodiment of the present invention, designed as an addition to a commercial plant, the feed consisting of a mixture of oxygen liquid and vapor derived from the commercial plant reboiler at a purity of about 99.7 percent. Hydrocarbon impurities are removed by rectification. Refrigeration is supplied by the liquid fraction of the feed, utilizing a nitrogen cycle for transfer to the required points.

FIGURE 6 is a schematic showing of an embodiment which is substantially similar to that of FIGURE 5, except for the fact that hydrocarbon impurities are removed by catalytic combustion.

Figure 7:
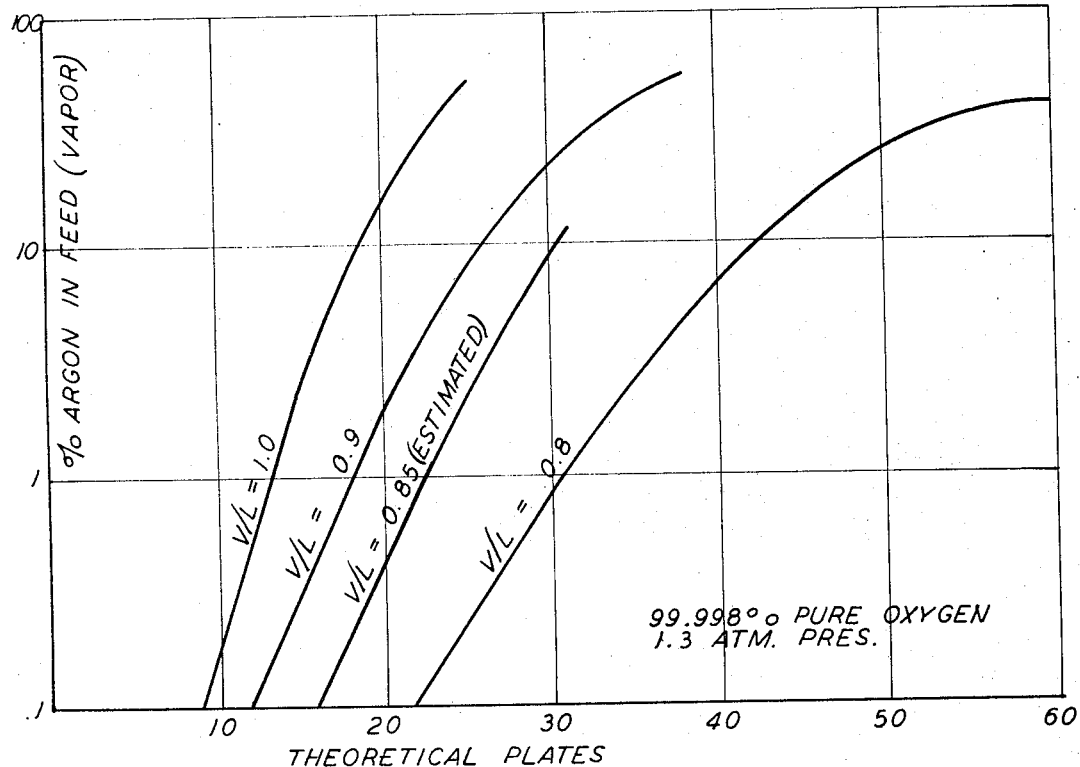

FIGURE 7 is a graph in which percent argon in the oxygen feed vapor is plotted logarithmically against the theoretical number of plates in the rectification column for vapor-to-liquid ratios ranging from 0.8 to 1.0.

Figure 8:
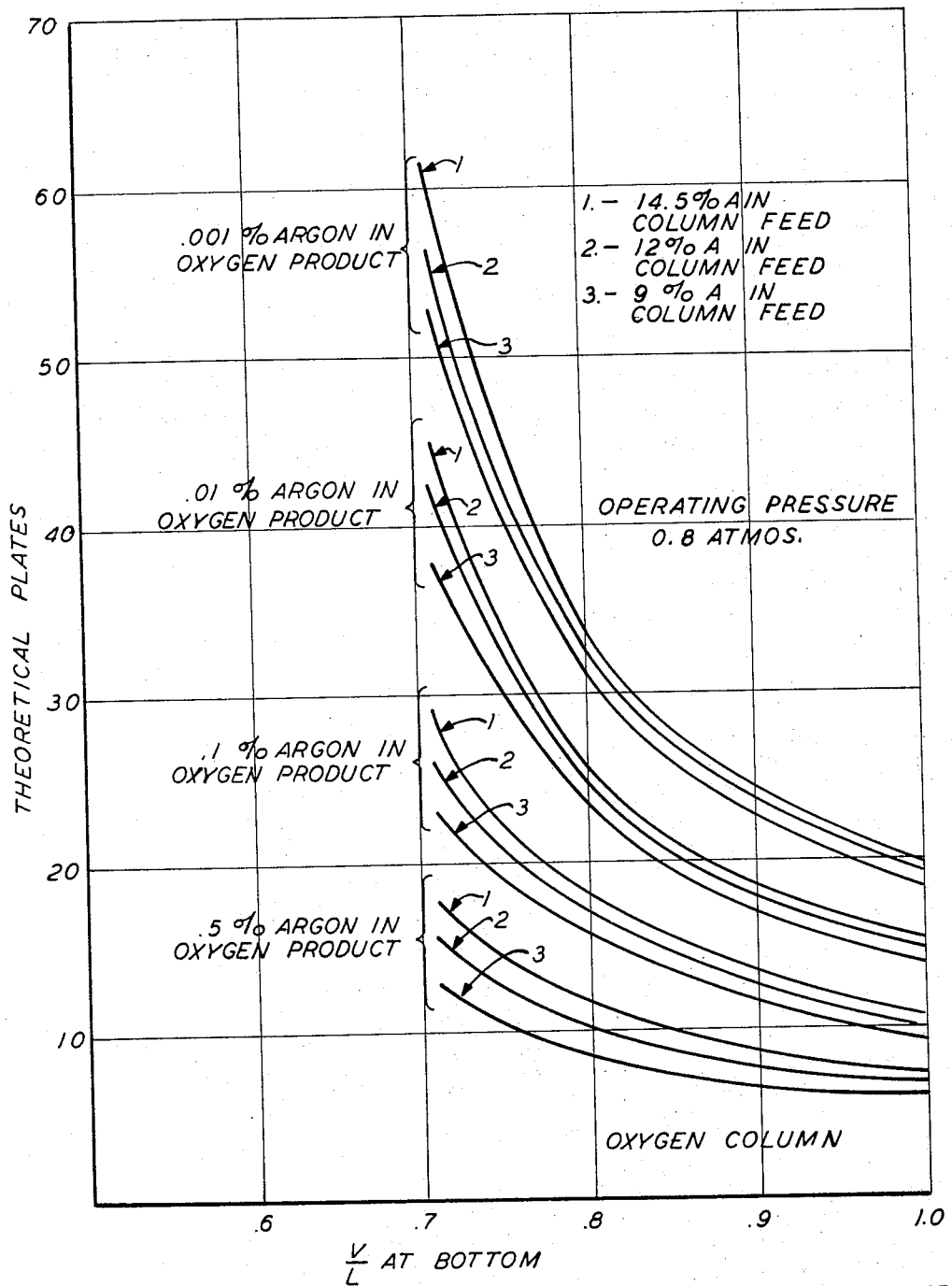

FIGURE 8 is a graph in which theoretical plates in the rectification column are plotted against vapor-to-liquid ratios at the bottom of the column for three different percentages of argon in the column feed and five different percentages of argon in the final product, at an operating pressure of 0.8 atmospheres.

Figure 9:
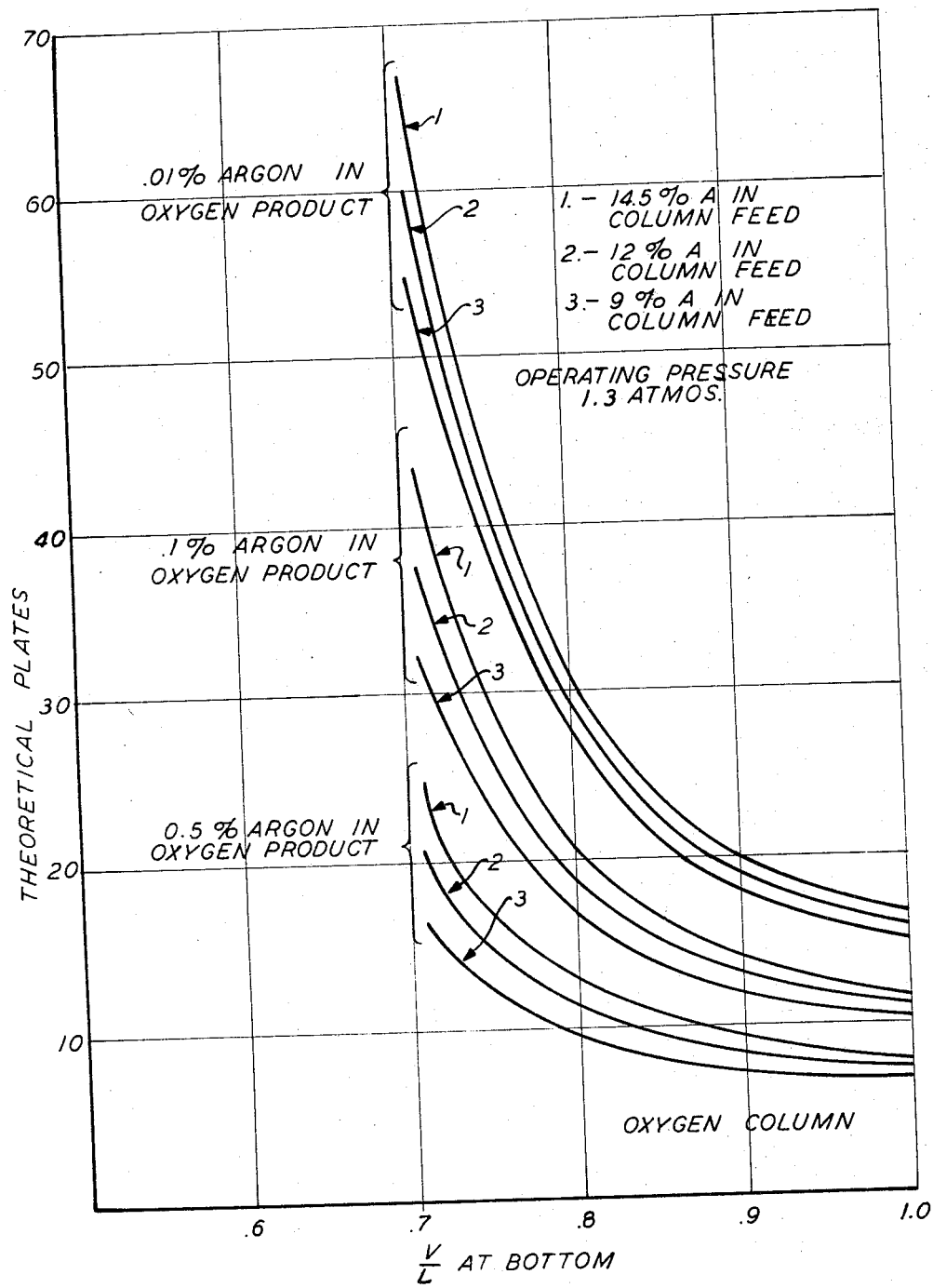

FIGURE 9 is a graph similar to FIGURE 8 in which the operating pressure is 1.3 atmospheres.

Figure 1:
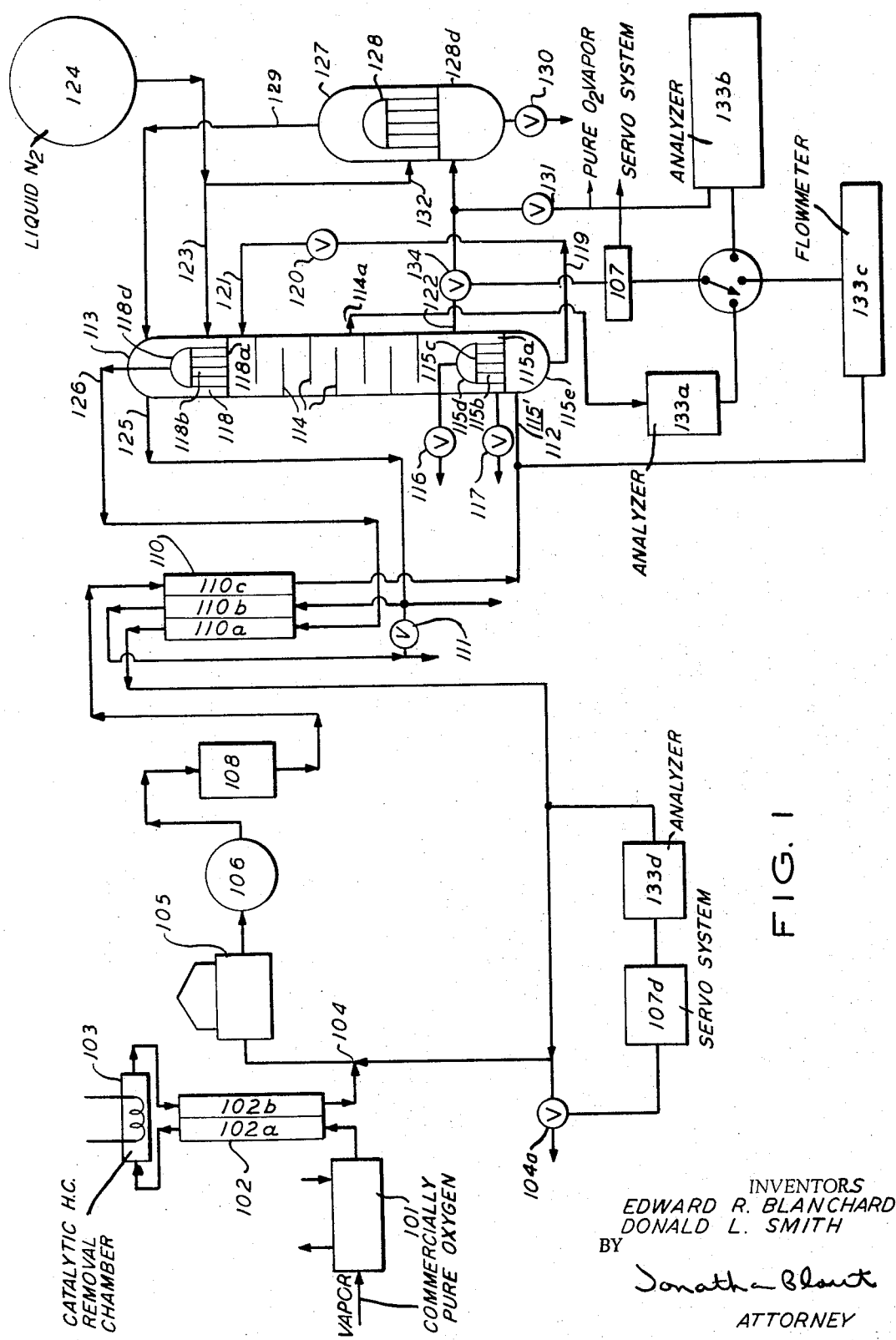

Referring to FIGURE 1 of the drawings, in the present illustrative embodiment a feed stock, consisting primarily of oxygen vapor having a purity of about 99.7 percent and including, say, 0.25 percent of argon, is taken from a conventional liquid oxygen producing plant. As a first step, the feed stock, at substantially atmospheric pressure, is brought up to ambient temperature at about 50 to 80 degrees Fahrenheit by passing through a coil 101 disposed in a warm water bath. This may be, for example, a copper helix, of a form well-known in the art. The feed stock is next passed through a two-way counterflow conventional heat exchanger 102 having a pair of substantially parallel, adjacent channels 102a and 102b. The incoming fluid stock passes through chamber 102a leading to the catalytic chamber 103, where it is warmed up to a temperature of about 1000 degrees Fahrenheit by heat exchange with the gas stream returning through adjacent chamber 102b.

The function of the catalytic chamber 103 is to remove methane and other hydrocarbon impurities which are initially present in the feed stock at a concentration of about, say, 17 parts per million, to a concentration of about one part per million or less. This is done by combustion over a catalyst in a standard manner, producing water and carbon dioxide which is removed later in the process.

The gas passing out of catalytic chamber 103 passes through the chamber 102b of the counterflow heat exchanger 102, where it loses heat to the incoming gas and is cooled down to a temperature of about 90 degrees Fahrenheit.

Next, the feed stream passes through the three-way T-shaped junction point 104, where it is merged with the recycled stream returning from the rectification column. The two streams pass into the gas holding chamber 105, which is a drum of stainless steel or some suitable metal, which serves to mix the gases thoroughly and is dimensioned to provide sufficient capacity ahead of the compressor 106.

The compressor 106 functions to adiabatically compress the incoming stream of gas from a pressure of about one atmosphere (15 pounds per square inch absolute) to about two atmospheres (30 pounds absolute). Compressor 106 may assume any of the forms well-known in the art which do not require lubrication.

From the compressor 106, the compressed gas stream passes at about ambient temperature into a drying chamber 108 for the removal of the water vapor and possibly, also, carbon dioxide. Chamber 108 is a drum of stainless steel or other suitable metal, the interior of which is charged with drying and absorbing material, such as, for example, granular alumina or one or more of the zeolites which serve to absorb both water and carbon dioxide. Arrangements are provided for removing and renewing drying agents periodically.

From chamber 108, the effluent gas passes into the counterflow heat exchanger 110, having three parallel channels 110a, 110b, and 110c. Here, the inflowing gas stream, having a pressure of about two atmospheres, is cooled from a temperature of about 80 degrees Fahrenheit down to its saturation temperature of about −284 degrees Fahrenheit in chamber 110c by heat exchange with liquid nitrogen and counterflowing gases in the parallel channels 110b and 110a, respectively. Traces of carbon dioxide and other impurities having freezing temperatures above the lowest temperature level of the heat exchanger 110 will freeze out and be deposited on the pipes as the gas stream passes through. These deposits are readily removed, either by periodically reversing the flow of gases through the exchanger or by permitting the system to rest for intervals during which the equipment rises to ambient temperature and the impurity gases are flushed out.

The saturated vapor at about −284 degrees Fahrenheit is led from channel 110c of heat exchanger 110 into the condenser compartment 115 in the bottom of the rectification column 113.

When the saturated vapor at about −284 degrees Fahrenheit flows into the condenser 115, it rises into the tubes 115b, where it is completely condensed on the inner walls, the oxygen rich liquid running down into a puddle in the bottom of the receptacle 115e. The neon, hydrogen, and helium vapors, having substantially lower boiling points than oxygen, rise up into top 115d of the condenser 115, from which they are periodically released by operation of the blow-off valve 116. The latter remains closed under normal operating conditions.

The oxygen rich liquid is then withdrawn from receptacle 115e through the outlet pipe 119 and passed through the expansion valve 120 where it undergoes isenthalpic expansion from a pressure of about 30 pounds per square inch absolute to 17 pounds per square inch absolute, with a temperature reduction from about −284 to about −295 degrees Fahrenheit.

The interior of the rectification column 113 is maintained at an operating pressure just sufficient to permit drawing out the product and the waste gases—in the present embodiment about 17 pounds per square inch absolute. The stream under purification, which is principally liquid with a small vapor fraction, at the aforesaid pressure, and at a temperature of about −295 degrees Fahrenheit, is introduced through the conduit 121 into the upper rectifying portion of the column 113, just below the lower plate 118a of condenser 118. Base plate 118a serves for mounting a plurality of condenser tubes 118b, which are placed below the top of the column. Thus, a gas-tight upper chamber is formed, into which the dished-top 118d supported by the condenser tubes 118b protrudes.

The central portion of the rectifying column 113 contains spaced apart plates 114. Each of the plates contains a large number of perforations. The vapor rising up through them prevents the liquid from running down through, the latter collecting until it spills into standpipes at the edges which carry it down to the next level. Inasmuch as argon and nitrogen have lower boiling temperatures than oxygen, these vapors ultimately rise to the top of the column, whereas a portion of the oxygen rich vapor is condensed on the tube walls of condenser 118 and the liquid oxygen trickles down to the bottom of the column through the successive plates, being stripped of impurities as it passes downward, collecting in external contact with the tubes 115b of condenser 115. Here, the purified liquid oxygen is reboiled by heat received from the condenser tubes 115b, given up by condensation of the saturated liquid entering the lower chamber through pipe 112. The function of valve 117, which is normally closed, is to provide a drainoff for liquid oxygen containing impurities with relatively high boiling points, such as krypton and xenon. A portion of the reboiled oxygen vapor is drawn off through pipe 122 and valve 134 in a manner to be discussed hereinafter.

The low boiling vapors comprising argon and a small amount of nitrogen, together with the remaining oxygen vapor, which rise through the tubes 118b of condenser 118 and into its dished head, pass out through the egress pipe 126 and back into heat exchangers 110 through channel 110a for recycle. This vapor stream enters channel 110 at a temperature of about −295 degrees Fahrenheit and a pressure of about 17 pounds per square inch absolute where it is heated up in the heat exchanger to about 70 degrees Fahrenheit. The recycled stream passes from heat exchanger 110 to junction 104 where it is combined with the incoming stream as previously described. The valve 104a is partially opened to release recycled gas to the atmosphere keeping the argon content of the stream at about, say, 10 mol percent, as will be presently described.

In the lower portion of the rectifying column 113, in external contact with the tubes of condenser 115, the high purity liquid oxygen collects at a temperature of about −295 degrees Fahrenheit. This liquid is completely reboiled by heat exchange through the walls of the condenser and a portion is led off through egress pipe 122 to motor-driven valve 134, the operation of which will be described in detail hereinafter. The vapor flows out of valve 134 at a temperature of about −295 degrees Fahrenheit and a pressure of about 17 pounds per square inch absolute, passing into chamber 128d where it is condensed to liquid in condenser 128. The liquid oxygen which is condensed in the condenser 128 forms a pool in the bottom of the chamber 128d from which it passes out through valve 130. If it is desired to extract superpure vapor instead of liquid from the system, the former is drawn off through the valve 131.

In the present embodiment, liquid nitrogen, acting as an auxiliary refrigerant, is supplied from an external source (drum 124) at a temperature of about −315 degrees Fahrenheit and a pressure of about 20 pounds per square inch absolute. Part of the liquid, of an amount sufficient to condense the oxygen vapor in condenser 118, passes through pipe 123 and into the upper chamber of rectifying column 113 external to the pipes 118b of condenser 118 to promote condensation of the oxygen vapors rising up through the condenser. The liquid nitrogen evaporates by external contact with the tubes of condenser 118, passing out of the dome of the rectifying column 113 through conduit 125 and into the chamber 110b of heat exchanger 110. In the latter, it is warmed up to about 70 degrees Fahrenheit in a heat exchange with the counterflowing oxygen-rich stream. From the heat exchanger 110, the nitrogen vapor is released into the atmosphere although, alternatively, if valve 111 is opened, heat exchanger 110 may be bypassed, the waste nitrogen being directly released to the atmosphere.

The other part of the stream of liquid nitrogen from the drum 124 passes through conduit 132 into the external upper portion of condenser 127 where it evaporates in a heat exchange with the purified oxygen stream which is being condensed to liquid inside of the condenser 128. The nitrogen vapor so formed by evaporation passes out of chamber 127 through egress pipe 129 and into the upper chamber of the rectifying column 113 where it merges with the vapor formed by evaporation of liquid nitrogen in external contact with condenser tubes 118.

An important feature in the operation of the present invention is that the vapor-to-liquid ratio in the main portion of rectifying column 113 shall be in excess of 0.700, and preferably as high as 0.9. This will be better understood by reference to FIGURES 7, 8, and 9 of the drawings. FIGURE 7 shows several plots, at different values of $V/L$ for a pressure of 1.3 atmospheres, of percent argon in the feed gas as a logarithmic function, against the theoretical number of plates in the rectifying column, where a purity of 99.998 percent purity is required in the oxygen end product. Note that as the $V/L$ ratio is lowered, the number of plates required for a specific percentage of argon impurity becomes larger, so that at a $V/L$ ratio of 0.700 an infinite number of plates would theoretically be required using an argon feed content of, say, 0.25 percent to achieve the desired purity of 99.998 percent in the oxygen product at the pressure indicated. FIGURES 8 and 9 show the theoretical number of plates plotted against values of $V/L$ at operating pressures of 0.8 and 1.3 atmospheres, respectively, for oxygen purification columns having argon feed contents of 9.0, 12.0, and 14.5 percent, respectively, where the purity of the final product ranges from 0.5 percent argon to 0.001 percent in different embodiments. In each case, it is seen that the number of theoretical plates is sharply reduced as the ratio $V/L$ is increased from 0.7.

The critical vapor-to-liquid ratio may be maintained at the desired level, in excess of 0.700, and preferably about 0.9, by any one of several different control methods.

In accordance with one method, a gas sampling probe 114a is introduced into the rectifying column 113 at a point part way up the column, the probe being placed where a prior calibration shows the concentration of argon impurity is about 0.1 mol percent during full operation of the system.

The gas sampling probe 114a is connected into a gas analyzing apparatus 133a which may take any of the forms well-known in the art suitable for determining the impurity content of the withdrawn vapor to the desired accuracy.

In the embodiment under description, the analyzer 133a can be so calibrated that when the concentration of argon exceeds about 0.1 mol percent at the probe point in the rectifying column 113, the analyzer output signal actuates a servo system 107. The latter may assume any of the forms well-known in the art, such as, for example, a relay which actuates a reversible motor or a pneumatic system, either of which is connected to open the valve 134. When the argon concentration at the probe point exceeds 0.1 mol percent, the valve 134 is partially closed, whereas when the argon content is less than 0.1 mol percent, valve 134 opens to increase the flow.

In accordance with another, more refined method of operation, a sample of the purified oxygen vapor is derived from valve 131 and is led into a vapor fraction analyzer 133b. Inasmuch as the quantities to be analyzed at this point in the system are small, analyzer 133b, which may be of the chromatographic type, must be of substantially greater sensitivity than analyzer 133a. This analyzer may be so calibrated that the differential electrical output signal is a function of the aggregate impurity content of the oxygen vapor product. When the purity of the product, as analyzed, falls below 99.998 percent, the electrical output from analyzer 133b is set to actuate servo system 107, or a similar system, which operates to partially close valve 134. When the purity of the product rises to above the reference value, the analyzer actuates servo 107 in a reverse direction, further opening valve 134.

As a further alternative to either of those mentioned in the foregoing paragraphs, the motor-driven valve 134 in conduit 122 is operated under control of a fluid flowmeter 133c which is set through a switch-connection to servo system 107 to regulate the outflow through valve 134 at a flow which is roughly equal to 10 mol percent of the inflow to column 113 through conduit 112.

Another feature of the system is that in order to avoid waste of oxygen, the argon content of the recycled stream is permited to build up until it exceeds a preselected concentration which is determined in accordance with the design factors in each purification system. In the embodiment under description, the argon impurity is permitted to build up in the recycled stream until it reaches about 10 mol percent. At this point, it is necessary to release a portion of the recycled gas through blow-off valve 104a. This is accomplished automatically by means of an additional analyzer 133d, similar to analyzer 133a, which is connected to sample the gas in the recycled stream at a point just ahead of valve 104a. When the argon concentration at that point exceeds 10 mol percent, or whatever standard has been selected for the system, analyzer 133d actuates a servo system 107d, similar to that previously described, which opens valve 104a to release gas. The valve remains open until the argon concentration falls below the selected standard, whereupon the servo 107d is actuated to close the valve.

The purification system disclosed in FIGURE 2 of the drawings is similar in many respects to that described with reference to FIGURE 1, the principal difference being that commercially pure liquid oxygen, instead of oxygen vapor, is brought in from a storage tank at the initial point in the system. Moreover, in this embodiment refrigeration is conserved by the use of a nitrogen cycle which is supplemented by stored liquid nitrogen.

Figure 2:
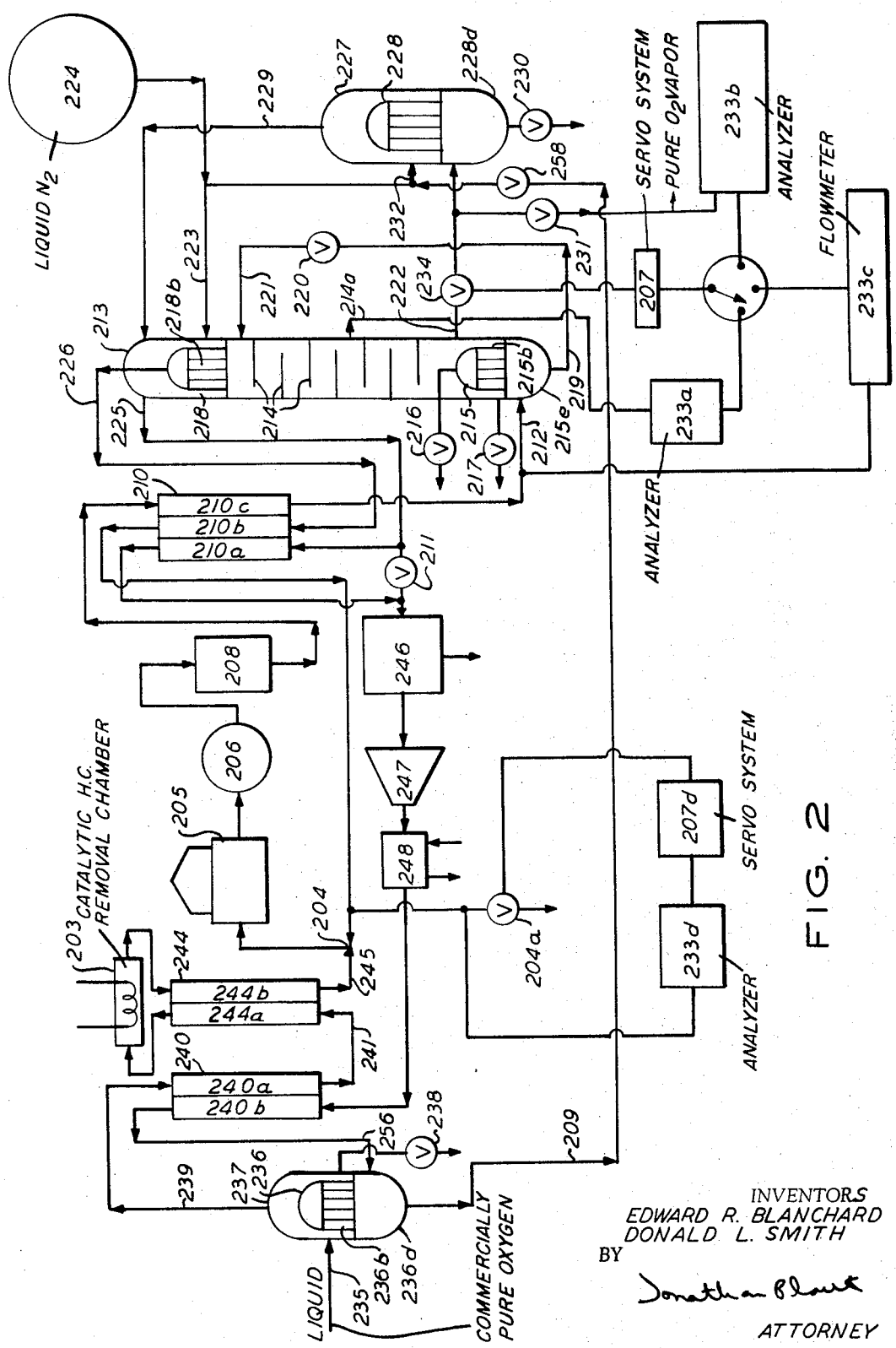

Referring to FIGURE 2, liquid oxygen, say, 99.7 percent pure, and containing, say, 0.25 mol percent of argon impurity, is led in, at the rate of 100 standard cubic feet per minute, a temperature of about −297 degrees Fahrenheit, and roughly atmospheric pressure, through ingress pipe 235 to the upper portion of the hollow chamber 237 which contains condenser 236. The hollow cylindrical chamber 237 and the condenser 236 are substantially the same in form as, for exmaple, the chamber 127 and the condenser 128, described with reference to FIGURE 1 of the drawings. The refrigerant is nitrogen which enters the lower portion 236d of condenser 236 and is condensed to liquid in the tubes 236b giving up heat which serves to evaporate the liquid oxygen in the upper portion of the chamber. The valve 238 permits the periodic withdrawal of a portion containing impurities, such as krypton and xenon concentrate.

The feed gas, primarily oxygen containing the higher boiling impurities and some hydrocarbons passes out through the dome of the chamber 237 through egress pipe 239 leading to chamber 240a of the two-way heat exchanger 240, where it is heated up from a temperature of about −297 to about 70 degrees Fahrenheit at substantially atmospheric pressure, by nitrogen vapor returning through the chamber 240b, which is cooled down from about 80 to about −285 degrees Fahrenheit.

The oxygen feed gas passes through connecting pipe 241, entering channel 244a of the two-way heat exchanger 244, where it is heated up from about 70 to about 1000 degrees Fahrenheit by the outgoing gases from catalytic chamber 203. The heat exchangers 240 and 244 are of any of the types well-known in the art, such as described, for example, with reference to similar equipment in the system of FIGURE 1. The catalytic chamber 203, which is constructed in a manner similar to catalytic chamber 103 of FIGURE 1, has the same function, namely, to remove methane and other hydrocarbons by combustion, producing water and carbon dioxide as by-products.

The oxygen-rich feed stream passes through the conduit 245 and into the junction 204 where it merges with recycled gas.

The feed stream and recycled stream pass into gas holder 205 which, as in the previous system, provides capacity ahead of compressor 206, and a chamber for the mixture of the merged gases. The merged gas streams then pass into the compressor 206, which is preferably of the form described with reference to the previous figure, where the gas is compressed adiabatically from about one atmosphere (15 pounds per square inch absolute) to about two atmospheres (30 pounds per square inch absolute). The compressed gas is then passed into the drying chamber 208, which corresponds to drier 108, previously described, where the water vapor and part of the carbon dioxide formed in the combustion chamber are removed.

From here on to the final product, the portion of the cycle devoted to the oxygen stream under purification is substantially as described with reference to the system of FIGURE 1. The aforesaid oxygen-rich stream passes through channel 210c of heat exchanger 210, where it is cooled from about 80 to −284 degrees Fahrenheit; and through the pipe 212, as a saturated vapor, into the base portion of the rectifying column 213. The saturated vapor is condensed on the inner tube walls 215b of condenser 215, forming a pool of liquid in the bottom chamber 215e which passes out through egress pipe 219 and through the expansion valve 220, where it undergoes an isenthalpic expansion from about 30 to about 17 pounds per square inch absolute and sustains a temperautre change from about −284 to about −295 degrees Fahrenheit. The cooled, expanded mixture of liquid and gas is introduced through the conduit 221 into the upper portion of rectifying column 213 just below the condenser 218. The liquid fraction trickles down through the perforated plates 214 of the rectifying column 213 in counterflow with the rising vapors, losing a proportion of the lower boiling impurities at each plate. The purified liquid oxygen, warmed about one degree as it travels down the column, finally collects in a receptacle in contact with the outer walls of condenser 215 where it is completely reboiled by heat exchange with the liquid condensing in the tubes 215b.

As previously explained with reference to FIGURE 1, a portion of the ultrapure oxygen vapor derived from the reboiling operation passes out through the egress pipe 222 under control of motor-driven valve 234, into chamber 227, at the rate equal to about one-tenth the inflow to rectification column 213 through conduit 212. The purified, saturated vapor is recondensed in condenser 228 by a heat exchange with liquid nitrogen flowing into the upper chamber. The final product is drawn off through egress pipe and valve 230 as liquid having a purity of 99.998 percent purity. Alternatively, ultrapure gas is drawn out through the valve 231.

As previously described with reference to the embodiment of FIGURE 1, the flow through valve 234 may be monitored in several different ways to maintain the vapor-to-liquid ratio in column 213 at about 0.9. In accordance with one method, sampling probe 214a is interposed in column 213 at a point where the argon impurity content is about 0.1 mol percent, and the sample so derived analyzed, for example (by the thermal conductivity method), in analyzer 233a. As previously described, the output of analyzer 233a actuates servo system 207 through a switch-connection, which, in turn, drives the valve 234 to increase or decrease the flow depending on the monitored argon content.

In accordance with another alternative, a portion of gas drawn from valve 231 is led through the analyzer 233b, which may be of a more sensitive chromatographic type, the electrical signal from which is connected through a switch to actuate servo system 207 to drive the motor-driven valve 234 in the manner previously described.

Alternative to either of the foregoing, a flowmeter 233c may be set to actuate servo 207 to control the flow at roughly 10 mol percent of the feed intake to the rectification column through conduit 212.

Also, as previously described, another analyzer 233d is connected to control valve 204a through servo system 207d to regulate the argon content of the recycled gas at roughly 10 mol percent.

It will be apparent that all of the system components numbered from 205 through 234 are constructed in substantially the same manner as their correspondingly numbered counterparts in the system of FIGURE 1.

The oxygen-argon recycle system is as follows. The vapor rising up to the top of the column 213, and out through the dome of condenser 218, which may be allowed to build up as high as 10 percent of argon impurity during operation, and which also includes a small proportion of nitrogen and other low boiling impurities as well as the balance of the oxygen, passes through egress pipe 226, connected to chamber 210b of heat exchanger 210, where it is warmed up from a temperature of about −295 to about 70 degrees Fahrenheit. The recycled stream then passes back to junction 204, the stop cock 204a providing for a release into the atmosphere of a portion of the recycled stream when this valve is opened manually or by a servo system as previously described.

Auxiliary liquid nitrogen passing out of the drum 224 at a temperature of about −315 degrees Fahrenheit and at atmospheric pressure, is merged with recycled liquid nitrogen, the merged stream being introduced into column 213 through conduit 223 in external contact with the tubes 218b of condenser 218 where it is evaporated. The latter is part of the stream of liquid nitrogen derived from a reservoir in the bottom of chamber 236d which passes through egress pipe 209 and through the isenthalpic-expansion valve 258. A portion is drown off at the junction with the ingress pipe 232. The latter leads to the upper portion of the chamber 227, evaporating in contact with the outer walls of the tubes of condenser 228, where it serves to extract heat for liquefying the ultrapure oxygen vapor in the lower portion. The valve 258 is of the form previously described with reference to valves 120 and 220 in the foregoing descriptions of FIGURES 1 and 2 and serves to provide isenthalpic expansion of the liquid nitrogen from an initial pressure of about 90 to a final pressure of about 36 pounds per square inch absolute and with a decrease in temperature from about −285 to about −305 degrees Fahrenheit.

The nitrogen vapor from the top of the chamber 227 passes out of the dome through the egress pipe 229 and into the dome of the rectifying column 213 where it merges with evaporated nitrogen from the ingress pipe 223. The nitrogen vapor, at a temperature of about −305 degrees Fahrenheit, passes out through egress pipe 225 and through passage 210a of heat exchanger 210 where it is heated up from about −305 to about 70 degrees Fahrenheit. The valve 211 permits the nitrogen vapor to bypass the heat exchanger 210, if so desired. The warmed nitrogen vapor, at a pressure of about 36 pounds per square inch absolute, passes through the surge drum 246 which provides capacity ahead of compressor 247. Means is also provided to exhaust excess gas into the atmosphere.

Compressor 247 is a conventional compressor of any of the types well-known, using conventional lubrication, in which the nitrogen vapor is compressed from about 36 to about 90 pounds per square inch absolute. The compressed nitrogen vapor then passes in a coil through a water bath 248, where it is cooled after compression to about 80 degrees Fahrenheit. It then passes through the chamber 240b of heat exchanger 240 where it is cooled down from a temperature of about 80 to about −285 degrees Fahrenheit by heat exchange with the incoming feed gases and to the lower portion of the chamber 236d where the saturated vapor is condensed to liquid by heat exchange with liquid oxygen feed gas evaporating in contact with the external surfaces of the tubes 236b of condenser 236.

Figure 3:
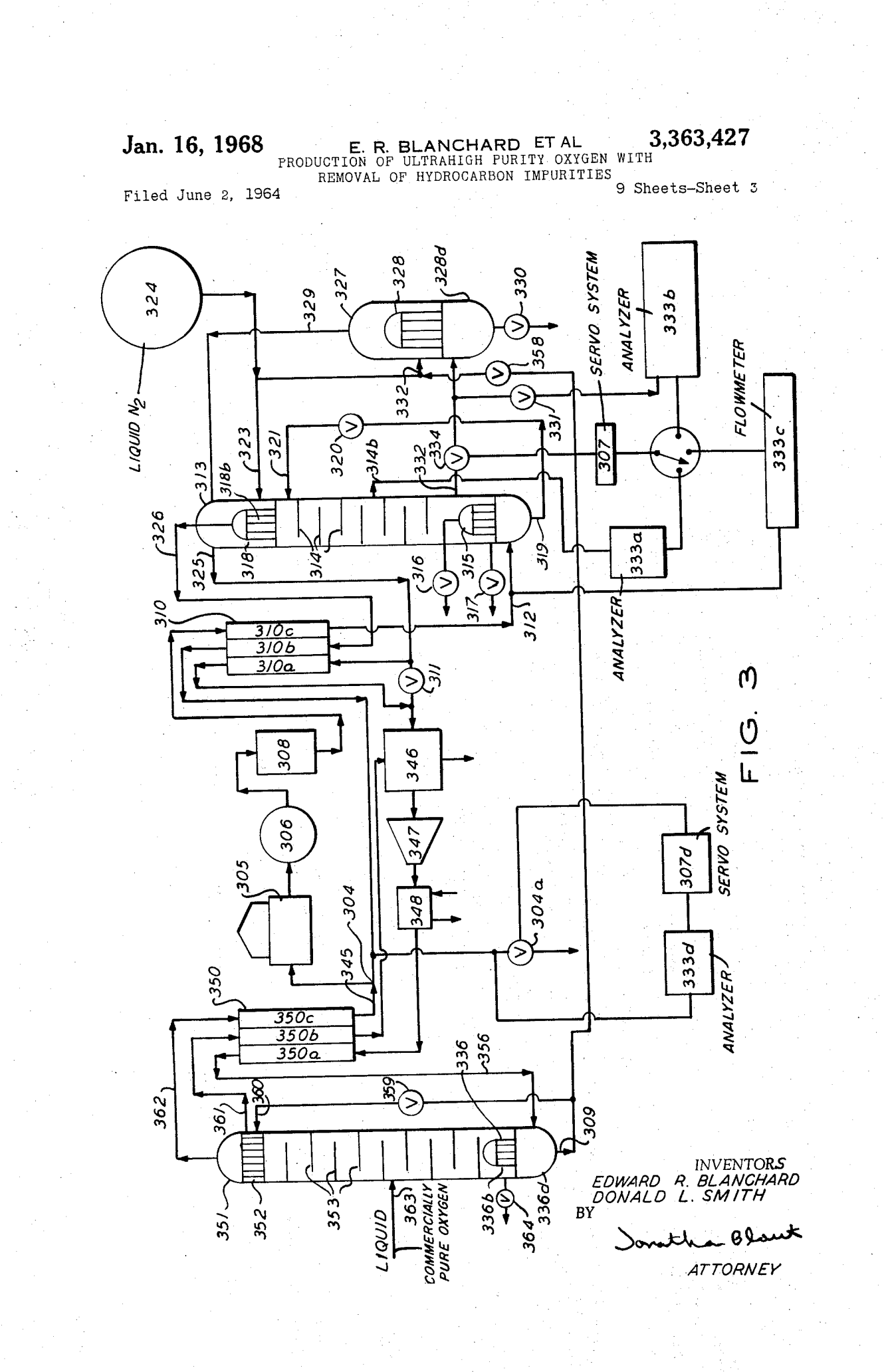

The embodiment shown in FIGURE 3 of the drawings is substantially the same as that shown in FIGURE 2 and described in the foregoing paragraphs, except for the fact that the initial stream of commercially pure liquid oxygen is brought into an auxiliary rectification column where the methane is stripped out instead of to a catalytic combustion chamber as in the previously described embodiments.

Referring in detail to FIGURE 3, a stream of commercially pure liquid oxygen, say 99.7 percent pure and containing, say, 0.25 mol percent of argon impurity, is introduced into the rectifying column 351 at a point about half-way up from the base, at a temperature of about −297 degrees Fahrenheit, a pressure of substantially 15 pounds per square inch absolute. A condenser 336, substantially similar to the condenser 236 described with reference to the previous figure is disposed in the base portion of the rectifying column 351. A condenser 352 is disposed in the top portion of column 351. In the present illustrative embodiment rectification column 351 has been designed to have a plurality of perforated plates spaced apart, part above and part below the feed point.

A stream of nitrogen vapor, having a pressure of about 90 pounds per square inch absolute and at saturation temperature, of about −285 degrees Fahrenheit, enters the base chamber 336d of the condenser 336, and is condensed in the tubes 336b of the latter to liquid which accumulates in the bottom of chamber 336d and is drawn off through egress pipe 309. Simultaneously, the liquid oxygen which has filtered down through about half of the plates of the rectification column 351 is evaporated in external contact with the tubes 336b of condenser 336; but the temperature, about −297 degrees Fahrenheit, is not sufficiently high to vaporize methane. Therefore, the latter remains liquid, collects adjacent the outside surface of the condenser 336, and is drawn off through the valve 364, which may be of any of the types well-known in the art to be suitable for low temperature applications.

A portion of the liquid nitrogen drawn off through egress pipe 309 passes through the valve 359 for isenthalpic expansion from a pressure of about 90 to about 36 pounds per square inch absolute and from a temperature of about −285 to about −305 degrees Fahrenheit. The valve 359 is similar in form to the valve 120 described with reference to the system of FIGURE 1. The cooled, expanded, partially liquid nitrogen passes, at a temperature of about −305 degrees Fahrenheit and pressure of about 90 pounds per square inch absolute, external to the tubes of the condenser 352 where it evaporates, absorbing heat from the oxygen-rich vapor, causing the latter to partially condense in the tubes. The remainder of the partially purified oxygen vapor passes out through the dome of the rectification tower 351 at a temperature of about −297 degrees Fahrenheit. The evaporated nitrogen passes through the egress pipe 361 to the channel 350b of heat exchanger 350 in parallel with the oxygen feed stream in channel 350c, both streams absorbing heat from the returning nitrogen stream in channel 350a and being heated up to a temperature of about −297 degrees Fahrenheit. The oxygen feed stream passes out of channel 350c of heat exchanger 350 through egress pipe 345 to junction 304, at which point it is joined by a recycled stream, the two streams being substantially merged in the gas holder 305.

The nitrogen stream emerging from heat exchanger 350 passes through the surge chamber 346, after which a fraction of it is expelled into the atmosphere.

The remaining portions of the cycle and recycle of the system of FIGURE 3 are substantially identical in structure and function to correspondingly numbered components of FIGURES 1 and 2, previously described.

Figure 4:
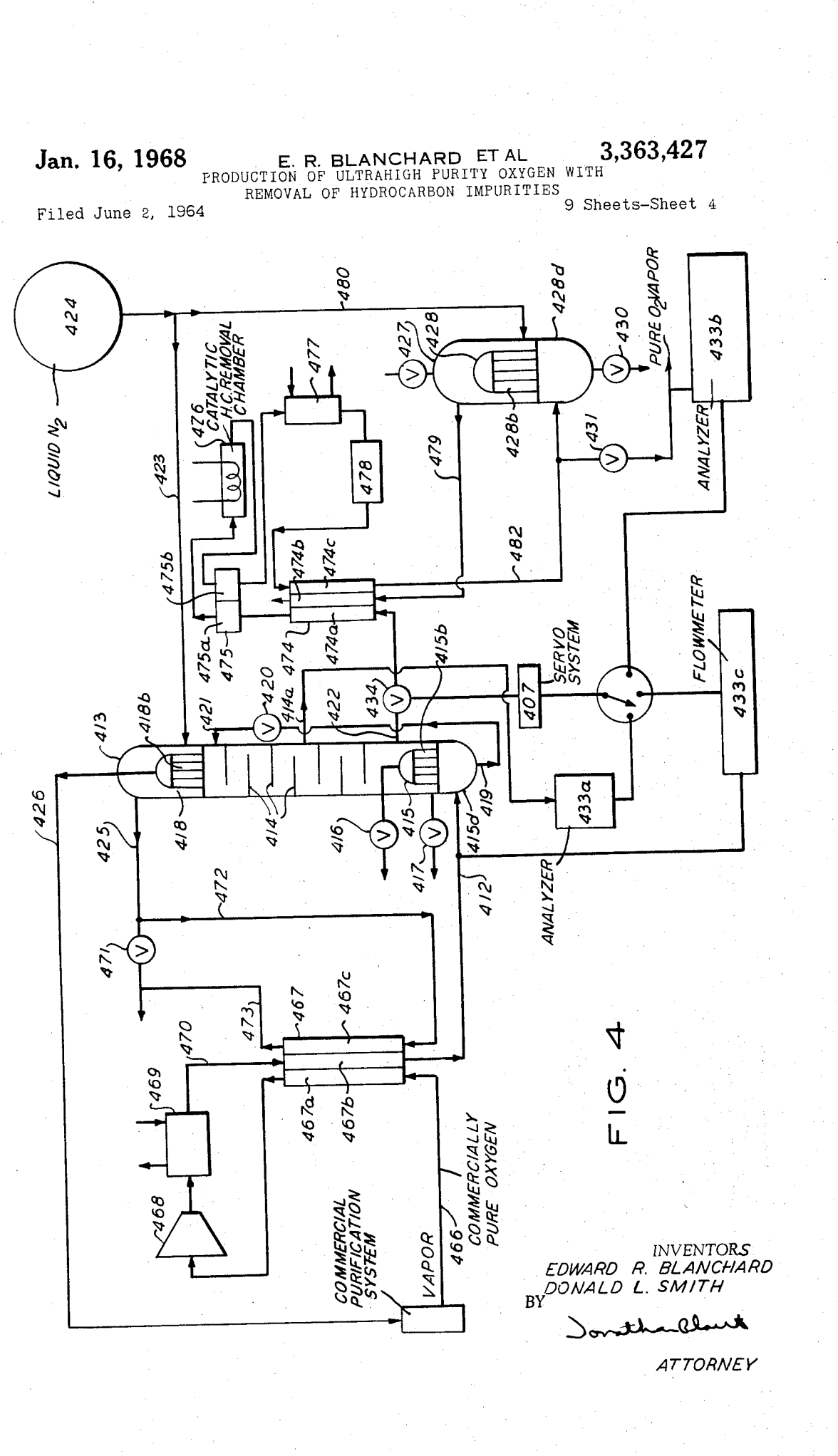

The system shown in FIGURE 4 of the drawings is designed to be used as an addition to a commercial plant, the feed being oxygen vapor taken from the commercial plant reboiler. In this system, about 10 percent of the feed is recovered as an ultrahigh purity product, the remaining 90 percent being returned to the main column. Methane impurity is removed by catalytic combustion in a manner similar to that disclosed with reference to the systems of FIGURES 1 and 2. Liquid nitrogen from an auxiliary source supplies the refrigeration to overcome heat leak and to liquefy the product.

Referring in detail to FIGURE 4, oxygen vapor, say, 99.7 percent pure and having 0.25 mol percent of argon impurity, is supplied from the oxygen reboiler in the commercial purification plant at a temperature of about −294 degrees Fahrenheit and a pressure of, say, about 18 pounds per square inch absolute.

The oxygen rich feed passes from the conduit 466 into channel 467a of the heat exchanger 467 where it is heated up to a temperature of about 70 degrees Fahrenheit by outgoing compressed gas. The oxygen feed stream is compressed from a pressure of about one atmosphere (15 pounds per square inch absolute) to about two atmospheres (35 pounds per square inch absolute) in the compressor 468. The latter is a dry compressor of any of the types well-known in the art.

The gas stream emerging from compressor 468 passes through the water bath 469, such as described with reference to 248 and 348 in FIGURES 2 and 3, where it is cooled down to a temperature of about 80 degrees Fahrenheit. It then passes through conduit 470 into the channel 467b of heat exchanger 467 where it is cooled down to a temperature of about −280 degrees Fahrenheit by the incoming gas stream in channel 467a and the nitrogen stream in channel 467c. The oxygen rich feed vapor, at saturation temperature, flows through the conduit 412 from which it is admitted to the lower chamber 415d of condenser 415 in the base of the rectifying column 413. There, it condenses on the inner walls of the condenser tubes 415b, forming a pool of liquid in the bottom of chamber 415d, which is led off though the conduit 419, passing through the valve 420, where it undergoes isenthalpic expansion from a pressure of about 35 to about 25 pounds per square inch absolute, at the same time decreasing in temperature from about −280 to about −287 degrees Fahrenheit. As in previously described embodiments, the partially liquid stream is introduced into the upper portion of column 413 through conduit 421, and the liquid fraction trickles down through a large number of perforated plates in contact with the rising vapor which strips the liquid of its low boiling impurities. The enriched liquid oxygen in the bottom of the rectifying column is completely reboiled by contact with the outer walls of condenser tubes 415b, where it receives heat from the condensing oxygen feed stream in the lower portions of the condenser. Vapor impurities such as neon, helium, and hydrogen, having substantially lower boiling points than the liquid oxygen, collect in the dome of condenser 415 and are drawn off at intervals through the valve 416. Other impurities, having substantially higher boiling points than oxygen, such as, for example, xenon and krypton, concentrate in the liquid oxygen and are drawn off from time to time through valve 417.

As in the previous embodiments, a portion of the reboiled oxygen vapor, including high percentages of low boiling impurities such as argon and nitrogen, rises through the contact plates 414 to the top of the column where the oxygen is partially recondensed in the tubes 418b of condenser 418, the remainder of the vapor, including nitrogen and argon impurities, passing out through the egress pipe 426 for return to the oxygen purification column. Condenser 418 is cooled by the evaporation of liquid nitrogen which passes in through conduit 423 and out, as vapor through conduit 425, in a circuit which will be described presently.

The rectification column 413 and auxiliary equipment including condensers 415 and 418 and the valves 416, 417, and 420 are substantially similar in form to like-numbered elements in the previously described systems.

A portion of the high purity oxygen reboiled in the lower part of the rectification column 413 passes out through conduit 422 and motor-driven valve 434, which operates in conjunction with one of the analyzers 433a or 433b, or with flowmeter 433c as previously described, monitoring the purity of the oxygen output. These components are constructed and operate substantially the same as their correspondingly numbered counterparts in FIGURES 1, et seq. In each case, the flow of vapor through conduit 422 is so controlled that the $V/L$ ratio in the column 413 is maintained at least as high as 0.700, and preferably, at 0.9, as previously described.

After passage through motor-driven valve 434, the oxygen rich vapor passes through chamber 474a of the heat exchanger 474 where it is raised in temperature from about −296 to about 80 degrees Fahrenheit by a heat exchange with the warm gases returning from catalytic chamber 476. In a second heat exchange step, the oxygen stream is warmed up from about 80 to about 1000 degrees Fahrenheit by passing through chamber 475a of heat exchanger 475 in a heat exchange with the hot gases returning from catalytic chamber 476.

The function of the chamber 476 is to purge the purified oxygen vapor of methane and other hydrocarbons by catalytic combustion, in a conventional manner as previously described with reference to the foregoing systems of FIGURES 1 and 2. The emergent oxygen stream, at a temperature of about 1200 degrees Fahrenheit, is cooled down to about 1000 degrees Fahrenheit by passing through channel 475b of heat exchanger 475. It is then passed through a water cooler 477 where it is cooled to a temperature of about 90 degrees Fahrenheit. At this point, the cooled, purified stream passes through a drying chamber 478 which is charged with, for example, zeolite or similar material, for absorbing water and carbon dioxide. The stream is then led through the channel 474c of heat exchanger 474, where it is cooled down from about 90 to about −286 degrees Fahrenheit, saturation temperature.

The saturated ultrapure oxygen vapor in conduit 482 passes into the lower part of chamber 427 of the condenser 428 where it is condensed to liquid on the inner surface of the condenser tubes 428b by heat exchange with evaporating liquid nitrogen introduced through conduit 480 into the upper part of chamber 427 in external contact with tubes 428b.

The superpure liquid oxygen product is drawn off through valve 430, under usual circumstances, or alternatively, the ultrapure vapor, prior to liquefaction, is drawn off through the valve 431. In one alternative embodiment; a portion of the ultrapure vapor passes into the analyzer 433b where its purity is metered by a standard analyzing method, such as a chromatographic method. If the purity exceeds a reference standard, say, 99.998 percent pure, servo system 407 is actuated to increase the amount of oxygen extracted through the motor-driven valve 434. If the purity of the product is less than the reference standard, the amount of oxygen withdrawn through valve 434 is decreased.

The nitrogen refrigerant in this embodiment runs through the following cycle. Liquid nitrogen, at one atmosphere pressure and a temperature of about −320 degrees Fahrenheit, is furnished from the drum 424. This stream divides, a first portion of an amount sufficient to condense the oxygen vapor in condenser 428 (as is true in the other figures discussed), passing through the conduit 480 into the upper chamber of condenser 428 for reboiling. The vaporized nitrogen passes out through conduit 479 and through the column 474b of the heat exchanger 474 where it is heated from about −320 to about 80 degrees Fahrenheit, extracting heat from the counterflowing oxygen rich vapor. The warmed nitrogen is released into the atmosphere.

A second portion, which constitutes the remaining portion (as is true in all the figures discussed) of liquid nitrogen from the drum 424 passes through the conduit 423 where it is introduced into the upper chamber of condenser 418 in the top of the rectifying column 413. Here it is boiled by heat extracted from the oxygen vapor condensing in the tubes 418b of condenser 418. The vaporized nitrogen passes out through conduit 425. A portion of this gas is released directly to the atmosphere through escape valve 471, which may take any of the forms well-known in the art and which is regulated at this point to maintain the nitrogen in the conduit at slightly in excess of atmospheric pressure. The remaining gas in conduit 425 passes through the conduit 472 leading into the channel 467c of heat exchanger 467 where it is heated up from a temperature of about −295 to about 70 degrees Fahrenheit, extracting heat from the oxygen vapor in channel 467b. The nitrogen stream flows out of heat exchanger 467 through conduit 473 and is released into the atmosphere.

The system of FIGURE 5, which is one of the preferred embodiments of the present invention, is designed to be an auxiliary to a conventional oxygen purification plant. In this embodiment, the feed stream is a mixture of vapor and liquid oxygen taken from the plant reboiler. By this process about ten percent of the oxygen feed can be recovered as an ultrahigh purity product, the remainder being returned to the main column in the conventional system. As in the system of FIGURE 3, methane is removed by rectification. The refrigeration in this embodiment is provided by the liquid fraction of the oxygen feed; but, is transferred to the required points by the use of a nitrogen cycle.

Referring in detail to FIGURE 5 of the drawings, twin conduits 535a and 535b, respectively, conduct oxygen feed vapor and oxygen feed liquid having a purity of 99.7 percent from the reboiler of a conventional oxygen rectifying column. The vapor fraction of the feed, enters the chamber 537 above condenser 536 at a pressure of about 20 pounds per square inch absolute. The liquid fraction enters the chamber 537 at the same pressure, where it is boiled, extracting heat from the nitrogen vapor which is thereby condensed in the tubes 536b of condenser 536. The oxygen feed vapor leaves the chamber 537 through conduit 539 which introduces it into the channel 540a of heat exchanger 540, at about −292 degrees Fahrenheit and substantially atmospheric pressure, where it is heated up to about 80 degrees Fahrenheit and then compressed to about 30 pounds per square inch absolute in compressor 547. The gas emerging from compressor 547 is cooled down to about 90 degrees Fahrenheit in water cooler 548, of a form previously described. The compressed feed stream enters the channel 540b of heat exchanger 540 and is cooled down to saturation temperature (about −284 degrees Fahrenheit) in a heat exchange with the stream of vapor flowing into the compressor.

The saturated feed stream passes through the conduit 512 and into the chamber 515d of condenser 515 in the base of the rectifying column 513. In the tubes 515b of the condenser 515, the saturated oxygen rich vapor is condensed to liquid by a heat exchange with the evaporating liquid in the lower portion of the rectifier column.

The condensed oxygen rich liquid collects in the lower chamber 515d and is drawn off through the conduit 519 which leads into the valve 520, where the liquid is expanded isenthalpically and simultaneously cools from about −284 to about 292 degrees Fahrenheit. The expanded, partially-vaporized liquid is introduced into the upper part of the column 513, below the condenser 518, where the liquid fraction and the condensed portion trickle down through the contact plates 514 in contact with the rising reboiled vapor, which strips the liquid of its low boiling impurities. The internal pressure in the column is maintatined at about 20 pounds per square inch absolute. The liquid, stripped of low boiling impurities, which collects in the lower part of the column 513 in external contact with condenser tubes 515b, is reboiled. The vapor rising to the top of rectifying column 513 contains oxygen and a number of lower boiling impurities, the principal of which is argon. A portion of this vapor is condensed inside the tubes 518b of condenser 518, giving up heat for the evaporation of liquid nitrogen in external contact with the condenser tubes.

About 90 mol percent of the rising vapor in rectifying column 513, including the low boiling impurities argon, nitrogen, neon, hydrogen, and helium, passes out through the dome of egress pipe 526, and back to the main column of the commercial oxygen purification system, which combines to provide the recycle in this embodiment. Assuming, for example, that the argon impurity content in the feed stream from the reboiler is 0.25 mol percent, then the argon content of the vapor passing back to the main column will be 0.25/.9 or 0.278 mol percent. The concentrations of the other low boiling impurities are increased in similar proportion in the gas stream going back to the main column, with the oxygen content proportionately reduced. Thus, he main column acts as a recycle column in this embodiment.

The remaining part of the partially purified oxygen rich vapor, including a liquid fraction of high boiling impurities, which is present in the lower part of the rectification column, just above the condenser 515, is drawn off at a temperature of about −292 degrees Fahrenheit, through the conduit 522 which contains the motor-driven valve 534a. The latter may be regulated under control of a flowmeter 533c, in accordance with one alternative, as previously described, to limit the outflow to about 10 mol percent of the inflow through conduit 512. This maintains the vapor-to-liquid ratio at the desired 0.9 percent in the column 513. It should also be pointed out that motor-driven valve 534a can be actuated in accordance with another alternative, by a servo mechanism 507 which is driven by an analyzer 533a connected to probe 514a interposed in rectification column 513; or, in accordance with still a further alternative, by a servo mechanism 507 driven by a sensitive analyzer 533b which is connected to receive and analyze the ultrapure product from column 583. The actuation of the motor-driven valve 534a, in the alternative, by the analyzer 533a or 533b is substantially as described with reference to the like-numbered components of FIGURE 1.

The vapor output, including a fraction of liquid impurities, is introduced from the valve 534a at a temperature of about −292 degrees Fahrenheit, part way up in the body of the second rectifying column 583 which has a suitable number of contact plates, above and below the point of introduction and in which the internal pressure is maintained at about 17 pounds per square inch absolute. The liquid fraction, including such impurities as methane, krypton and xenon, trickles down through the contact plates, finally collecting in a liquid reservoir above the nitrogen condenser 585, and is reboiled by a heat exchange in which the saturated nitrogen vapor, at a temperature of about −285 degrees Fahrenheit, is condensed to liquid in the lower portion of the condenser. The liquefied high boiling impurities, krypton and xenon, and hydrocarbons such as methane are drawn off through valve 587.

The liquid oxygen fraction, after reboiling, rises through the contact plates to the top of column 583, becoming progressively purified. There, it is partially condensed in tubes 588b of condenser 588 by heat exchange with evaporating liquid nitrogen in the upper chamber, as will be described with reference to the refrigeration cycle hereinafter.

The condensed ultrapure liquid oxygen, 99.998 percent pure, which is the final product of the process, passes out through the valve 534b as a saturated liquid, at a temperature of about −297 degrees Fahrenheit, undergoing a pressure drop of about two and one-half pounds per square inch. Alternatively, the final product can be removed as a vapor from the top of the column above the condenser 588.

The nitrogen refrigeration cycle is as follows. Nitrogen vapor, at a temperature of about −305 degrees Fahrenheit and a pressure of about 36 pounds per square inch absolute, enters channel 567b of heat exchanger 567, where it is heated up to about 80 degrees Fahrenheit. It is then compressed to about 90 pounds per square inch absolute in the compressor 568. The compressed nitrogen gas is then water cooled in the heat exchanger 569 to a temperature of about 90 degrees Fahrenheit and further cooled in channel 567a of heat exchanger 567 to a saturation temperature of about −285 degrees Fahrenheit. This saturated nitrogen vapor then passes through the conduit 597 to junction 598 where it dvides in the manner described with relation to the figure, one portion passing through conduit 582 of the lower chamber 585d of condenser 585, and the remainder passing through conduit 599 to the lower chamber 536d of condenser 536. In each of the aforesaid cases, the saturated nitrogen vapor is condensed to liquid in the respective condenser by heat exchange with evaporating oxygen rich stock. The liquefied nitrogen from each of the condensers is drained off through conduits 509 and 581, respectively, which are joined together at junction 596. The merging streams of liquid nitrogen are conveyed to the junction 594 where a portion passes through valve 593. The remainder passes through valve 595, where each portion is isenthalpically expanded from about 90 to about 36 pounds per square inch absolute, undergoing a temperature change from about −285 degrees Fahrenheit to saturation temperature at about −305 degrees Fahrenheit. The cooled, expanded nitrogen streams pass through the external chambers of condensers 518 and 588 where they are each boiled to vapor in a heat exchange with oxygen rich vapor condensed inside of the tubes of each of the condensers. The two nitrogen vapor streams passing out through conduits 591 and 525 merge at the entrance to channel 567b of heat exchanger 567, where the cycle is repeated.

The embodiment shown in FIGURE 6 of the drawings is identical to that of FIGURE 5, except that in the former methane is removed by catalytic combustion. The cycle of the oxygen stream under purification is substantially similar to that described with reference to the previous figure, in the process through the condenser 636, heat exchanger 640, compressor 647, and the rectification column 613, from which column about 10 mol percent of the oxygen vapor, substantially purified of the low boiling impurities argon, nitrogen, neon, helium, and hydrogen is derived.

In this embodiment, the second rectification column 583 of FIGURE 5 is replaced by a system comprising heat exchangers 674 and 675, the catalytic combustion chamber 676, water cooler 677, the drier 678, and the final condenser 628. The partially purified liquid oxygen at a saturation temperature of about −292 degrees Fahrenheit and a pressure of about 20 pounds per square inch absolute, passes through the conduit 622 and the motor-driven valve 634a, which may be operated to control the flow of partially purified oxygen to roughly 10 percent of the flow in conduit 612, or according to any of the alternatives discussed with reference to FIGURE 5. From valve 634 it flows into the chamber 674a of heat exchanger 674, where it is heated up to a temperature of about 80 degrees Fahrenheit in a heat exchange with oxygen vapor. It is then passes through the channel 675a of heat exchanger 675, where it is heated up to a temperature of about 1000 degrees Fahrenheit at the entrance to the catalytic chamber 676. In the latter as in the previous embodiments having a catalytic combustion chamber, the methane and other hydrocarbon impurities are converted in the presence of a catalyst by combustion at about 1200 degrees Fahrenheit to water and carbon dioxide. The gas stream leaving the catalytic chamber at about 1200 degrees Fahrenheit passes into channel 675b of heat exchanger 675 where it is cooled down to about 100 degrees Fahrenheit in a heat exchange with the reverse flowing gas stream in chamber 675a. It is then cooled about another ten degrees in the water cooling system 677, emerging therefrom and passing through the drying chamber 678, substantially similar to the drying chamber 108, containing zeolite or the like for absorbing the water vapor and the carbon dioxide. From drying chamber 678 the gas stream passes into channel 674b of the heat exchanger 674 where it is cooled from about 90 to about −286 degrees Fahrenheit in a heat exchange with the partially purified liquid oxygen stream from conduit 622. The gas stream leaves channel 674b of the heat exchanger 674 at substantially saturation temperature, passing through conduit 682 to the lower chamber 628d of condenser 628. In accordance with one alternative, the saturated vapor may be withdrawn through the valve 631. As previously discussed, a portion of the vapor may be analyzed in the analyzer 633b, impulses being derived from the output therefrom to drive a servo system 607 which controls the rate of flow through the valve 634 in accordance with the purity of the final product. Valve 634 may also be controlled, in the manner described with reference to previous embodiments, by a flowmeter 633c, or in response to analyzer 633a.

In accordance with another alternative, the saturated vapor from conduit 682 is condensed to liquid in condenser 628 by heat exchange in which liquid nitrogen is boiled in chamber 627. The liquid oxygen resulting from the condensation, at a purity of 99.998 percent, may be withdrawn from the bottom of chamber 628d through valve 630, as the final product.

The nitrogen cycle in the embodiment of FIGURE 6 is as follows. As in the previous embodiment, nitrogen vapor at about −305 degrees Fahrenheit and a pressure of about 36 pounds per square inch absolute, passes through the chamber 667b of heat exchanger 667, where it is heated up to a temperature of about 80 degrees Fahrenheit. From the heat exchanger 667 the warmed nitrogen stream passes into the compressor 668 where it is compressed from about 36 to about 90 pounds per square inch absolute. The compressed vapor then passes through the water cooler 669 and the channel 667a of heat exchanger 667, where it is cooled from about 90 to about −285 degrees Fahrenheit, the saturated nitrogen vapor passing through the conduit 697 to the lower chamber 636d of the condenser 636, where it is condensed to liquid by heat exchange with the liquid oxygen boiled in the upper chamber 637. The liquid nitrogen is then passed through the conduit 609 to the junction 694, where it divides into two portions, as previously described one portion passing into the valve 695 and the remaining portion passing into valve 693. In both of these valves the respective streams are expanded isenthalpically from about 90 to about 36 pounds per square inch absolute, and are simultaneously cooled from about −285 to about −305 degrees Fahrenheit. The cooled, expanded partially-vaporized liquid nitrogn streams are then respectively evaporated in the external portions of condensers 618 and 628, by heat exchange with condensing oxygen rich vapors in each. The streams of vapor returning from condensers 618 and 628 through conduits 625 and 629 are merged at the entrance to channel 667b of heat exchanger 667, where the cycle repeats.

All of the components of this embodiment, including the condensers 636 and 628, the rectification column 613, and the various heat exchangers and valves are substantially similar to like-numbered components in the previosuly described embodiments.

It will be apparent to those skilled in the art that the systems, including specific apparatus components, precise temperatures and pressures, which are disclosed herein by way of illustration, are not to be construed as limiting the scope of the present invention, which is set forth in the appended claims.

We claim:
1. The method of producing ultrahigh purity oxygen from comercially pure oxygen feed stock having a residue of low boiling impurities which comprises in combination the steps of
deriving a feed stream from a source of said commercially pure oxygen feed stock,
compressing said feed stream,
cooling said compressed feed stream to the saturation point,
condensing said feed stream to liquid in a condenser disposed in the bottom chamber of a rectification column,
isenthalpically expanding and thereby cooling said liquid stream,
introducing said cooled, expanded stream into the upper portion of said rectification column,
permitting said liquid to trickle down through a large number of contact plates in said rectification column in countercurrent with vapor rising in said column for progressively stripping said low boiling impurities from said liquid,
wherein the pressure in said rectification column is manitained at slightly above atmospheric pressure,
and wherein the vapor-to-liquid ratio in said column is maintained in excess of about 0.700,
permitting said liquid to collect in a reservoir in the bottom of said column in external contact with the condenser disposed in said bottom chamber,
completely reboiling the liquid collected in said reservoir in a heat exchange with said condensing feed stream,
drawing off a regulated portion of the purified vapor derived from said reboiling operation from the lower portion of said rectification column,
and returning the balance of said vapor including said low boiling impurities from the top of said rectification column through a recycle path to rejoin said feed stream.

2. The method in accordance with claim 1 wherein said regulated portion of purified vapor drawn off from the lower portion of said rectification column is condensed to produce a final liquid product.

3. The method in accordance with claim 1 in which the purity of said product is monitored and the rate of flow of the portion of said purified vapor which is drawn off is a function of said purity,
the said rate being increased when said purity increases above a preselected standard and decreased when said purity falls below said preselected standard.

4. The method in accordance with claim 1 wherein the rate of flow of said portion of purified vapor drawn off constitutes about 10 mol percent of that of said feed stream into said rectification column,
and the balance of said vapor returned from the top of said rectification column through said recycle path includng said low boiling impurities constitutes about 90 mol percent of said feed stream.

5. The method in accordance with claim 1 wherein the argon impurity content in the balance of said vapor returning through a recycle path to rejoin said feed stream is permitted to build up until it constitutes about 10 mol percent of said balance.

6. The method in accordance with claim 1 wherein
said commercially pure oxygen feed stock includes a residue of hydrocarbon impurities,
and said method includes the step of removing said hydrocarbon impurities by catalytic combustion.

7. The method in accordance with claim 1 wherein
said commercially pure oxygen feed stock includes a residue of hydrocarbon impurities,
and said method includes the step of removing said hydrocarbon impurities by scrubbing in a rectification column.

8. The method in accordance with claim 1 wherein the balance of said vapor including said low boiling impurities is returned from the top of said rectification column through a recycle path which includes the system for producing said commercially pure oxygen.

9. The method in accordance with claim 1 wherein an auxiliary nitrogen cycle supplies refrigeration for cooling said feed stream to the saturation point and for condensing said feed stream to liquid in at least one point in the cycle of said feed stream.

10. The method in accordance with claim 9 wherein said nitrogen is supplied from an external source of liquid nitrogen.

11. The method in accordance with claim 9 wherein a liquid fraction of said feed stream supplies refrigeration for condensing the nitrogen in said nitrogen cycle to liquid.

12. A system for converting commercially pure oxygen into ultrahigh purity oxygen which comprises in combination
a source of a feed stream of said commercially pure oxygen having a purity of about 99.7 percent,
a principal system of gas-tight conduits connected to said source and forming a complete circuit,
compressing and refrigeration means interconnected with said circuit for reducing said feed stream to the saturation point,
a rectification column interconnected with said circuit, said column including a first condenser disposed in its base portion, a second condenser disposed in its upper portion, and a plurality of perforated contact plates disposed in the body of said column between said condensers,
means for introducing said feed stream at the saturation point into said first condenser for completely condensing said feed stream to liquid,
means including a valve connected to said first condenser for withdrawing and isenthalpically expanding the liquid stream from said first condenser,
means connected to said valve for introducing said expanded, cooled stream into the upper portion of said rectification column above said contact plates and below said second condenser,
said second condenser in contact with refrigeration means for reducing vapor including a vapor fraction of said last-named stream to liquid,
means including vapor rising through the perforated contact plates in said rectification column for stripping the low boiling impurities from said liquid passing down through said column,
a receptacle in contact with the external portions of said first condenser for collecting and completely reboiling said liquid to vapor in a heat exchange with said condensing feed stream,
an exhaust conduit including a regulated valve connected in the lower lateral portion of said rectifying column for drawing off a measured portion of said reboiled vapor,
and means interconnected with said conduit system from the upper part of said rectification column for returning the vapor remaining after withdrawal of said portion of reboiled vapor through a recycle path to a junction with said feed stream.

13. The combination in accordance with claim 12 which includes a flowmeter connected to said regulated valve constructed and arranged to maintain said measured portion at about 10 mol percent of the feed stream into said rectification column.

14. The combination in accordance with claim 12 in which said system includes a catalytic chamber and drying means interconnected with said principal conduit system for purging hydrocarbon impurities from said feed stream.

15. The combination in accordance with claim 12 in which said system includes in combination an auxiliary rectification column for scrubbing hydrocarbon impurities from said feed stream.

16. The combination in accordance with claim 12 including means in the lower portion of said rectification column for scrubbing out impurities having a boiling point substantially higher than that of oxygen, and means for drawing off said higher boiling impurities.

17. The combination in accordance with claim 12 which includes an analyzer connected to measure the impurity concentration of the vapor at a preselected point in said rectification column,
and means including a servo system responsive to said analyzer for regulating the opening of said regulated valve as a function of said impurity concentration.

18. The combination in accordance with claim 12 which includes an analyzer connected externally of said rectification column to receive and test the purity of said measured portion,
and means including a servo system responsive to said analyzer to control the opening of said regulated valve as a function of the purity of said portion.

19. The combination in accordance with claim 12 which includes an analyzer connected to measure the impurity concentration of said recycled stream at a preselected point in said recycle path,
a blow-off valve connected in said recycle path ahead of the junction with said feed stream,
and means including a servo system responsive to said analyzer for regulating the opening of said blow-off valve in accordance with the impurity content of said recycled stream.

20. The combination in accordance with claim 12 including final condensing means connected to an independent cycle including said refrigeration means for condensing the portion of said reboiled vapor withdrawn from said rectification column to produce a liquid product in a heat exchange with evaporation of said refrigeration means.

21. The combination in accordance with claim 12 in which said refrigeration means comprises a supply of liquid nitrogen moving in a separate conduit system from the cycle of said feed stream in said principal system, said separate conduit system connected externally to at least one condenser for evaporating said liquid nitrogen in a heat exchange with said feed stream condensing in said condenser.

22. The combination in accordance with claim 21 wherein said refrigeration means includes an external source of liquid nitrogen connected to said separate conduit system for supplying liquid nitrogen thereto.

23. The combination in accordance with claim 21 wherein said separate conduit system is connected to a condenser for condensing at least a portion of the liquid nitrogen in said separate conduit system in a heat exchange with an evaporating liquid fraction of said feed stream.

24. A system for converting commercially pure oxygen having a residue of impurities with boiling points below that of oxygen to ultrahigh purity oxygen which comprises in combination
a source of a feed stream of commercially pure oxygen,
means for cooling and compressing said feed stream to the saturation point,
a rectification column including a pair of condensers and a plurality of perforated contact plates, the first said condenser disposed in the lower portion of said column below said contact plates and the second said condenser disposed in the upper portion of said column above said contact plates,
means for introducing said compressed, cooled feed stream into said first condenser for condensing said feed stream to liquid,
means including a valve for withdrawing said liquid from said one condenser and isenthalpically expanding and thereby cooling and partially vaporizing said liquid,
means for introducing said partially vaporized liquid into said rectification column above said contact plates but below said second condenser, whereby the vaporized fraction is partially condensed to liquid and filters down together with the remaining liquid fraction through said contact plates to the lower portions of said column in counter-current with rising vapor for stripping said impurities from said liquid,
reboiling means comprising a reservoir in the lower portions of said column in contact with the external portions of said one condenser for collecting and completely reboiling said liquid to purified vapor in a heat exchange with said condensing feed stream,
means interposed laterally into said column adjacent said reboiling means for drawing off a portion of said vapor, said means including a valve for regulating the withdrawn portion of said vapor in accordance with a preselected standard whereby the vapor-to-liquid ratio in the lower portion of said column is maintained in excess of about 0.700,
and circuit means connected to the upper portion of said column for returning the balance of said vapor including said impurities from said column through a recycle path to a junction with said feed stream.

25. The system in accordance with claim 24 including a rectification column in which the number of said contact plates exceeds 26 when the feed stream to be processed contains at least about 0.25 mol percent argon.

26. A system in accordance with claim 24 wherein the pressure in said column is slightly in excess of atmospheric pressure.

27. A system for converting commercially pure oxygen comprising at least about 0.25 mol percent argon, and a residue of impurities including nitrogen, and hydrocarbons, into oxygen at least about 99.99 percent pure which comprises in combination with a circuit of gas-tight conduits,
a source of a feed stream of commercially pure oxygen vapor,
means including a first heat exchanger for warming said vapor from ambient temperature to substantially about 1000 degrees Fahrenheit,
a catalytic chamber connected to receive the warmed feed stream from said first heat exchanger and to purge hydrocarbon impurities therefrom by catalytic combustion,
means including said first heat exchanger connected to receive said stream from said catalytic chamber and to cool said feed stream to substantially ambient temperature in countercurrent with said feed stream,
a junction connected to receive the cooled stream from said heat exchanger wherein the said stream merges with a recycled stream in said system,
means for compressing said merged streams to substantially about two atmospheres pressure,
a second heat exchanger connceted to receive the compressed stream from said compressor for reducing the temperature from about ambient temperature to substantially the saturation temperature of said compressed stream,
a rectifying column having a pair of condensers, the first one of said condensers disposed in the lower portion of said column and the second one of said condensers disposed in the top of said column, said condensers separated by a chamber containing in excess of 26 perforated contact plates, means connected to said last-named heat exchanger for introducing the cooled, saturated stream into said first condenser for converting said stream to liquid, a receptacle for receiving said liquid, means connected to said receptacle for withdrawing said liquid therefrom, said means containing a valve for expanding said liquid isenthalpically to produce an expanded, cooled liquid having a vapor fraction, means for introducing said expanded liquid including said vapor fraction into the upper portion of said rectifying column, means including vapor rising through said contact plates for stripping liquid trickling down through said column of low boiling impurities, a receptacle in contact with the external portions of said first condenser for collecting and completely reboiling said liquid to vapor, a conduit connected laterally to said column above said first condenser for drawing off a portion of said reboiled vapor, means comprising a motor-driven valve interposed in said last-named conduit for regulating the flow therein to maintain the vapor-to-liquid ratio in said column in excess of 0.700, a third condenser connected to receive the vapor portion from said valve for condensing said vapor portion to a final liquid product, means connected to the upper portion of said rectifying column for returning the balance of the vapor from said column, after removal of said portion, through a path including said second heat exchanger to said junction for merging with said feed stream, and auxiliary means for providing refrigeration for said system including a source of liquid nitrogen connected to move in a separate cycle from said feed stream, means for conveying said liquid nitrogen to said second and third condensers for evaporation therein, and means for passing said evaporated nitrogen through said second heat exchanger for cooling said feed stream to the saturation temperature.

28. The combination in accordance with claim 27 wherein said feed stream constitutes a source of a feed stream of commercially pure liquid oxygen, which includes in the initial portion of said system a fourth condenser into which said liquid feed stream is initially introduced and evaporated in a heat exchange with a portion of nitrogen from said nitrogen refrigeration cycle passing through the lower portions of said fourth condenser, for condensing said nitrogen to liquid thereby to transfer a portion of the refrigeration derived from said liquid feed stream to supplement the refrigeration produced by said liquid nitrogen in said heat exchangers and condensers in the subsequent portions of said system.

29. The combination in accordance with claim 27 wherein said feed stream comprises commercially pure liquid oxygen and wherein said catalytic chamber is replaced by an initial auxiliary rectification column including a fourth condenser in the base of said auxiliary column, means for introducing said liquid feed stream partway up in said rectification column, a receptacle for collecting and reboiling said liquid in the lower portions of said column in external contact with said fourth condenser for initially purging the carbohydrate impurities from said feed stream, and means for interconnecting said auxiliary nitrogen circuit to said fourth condenser for condensing said nitrogen to liquid by a heat exchange with said evaporating feed stream, thereby to transfer refrigeration derived from said liquid feed stream to subsequent portions of the system as a supplement to the refrigeration derived from said liquid nitrogen source.

30. A system for converting commercially pure oxygen vapor, comprising at least about 0.25 mol percent of argon and a residue of impurities which may include nitrogen, and hydrocarbons, to ultrapure oxygen at least about 99.99 percent pure which comprises in combination with a circuit of gas-tight conduits means for deriving a feed stream of said commercially pure oxygen vapor directly from the reboiler of a commercial rectification column, a first heat exchanger for warming said liquid feed stream substantially to ambient temperature, means for compressing said feed stream to a pressure in excess of two atmospheres, means including said first heat exchanger for cooling said compressed feed stream to substantially the saturation point, a rectification column having a pair of condensers, the first one of said condensers disposed in the lower portion of said column and the second one of said condensers disposed in the top portion of said column, said condensers separated by a chamber containing in excess of 26 perforated contact plates, said first heat exchanger connected to said first condenser for introducing said saturated feed stream into said condenser and for condensing said feed stream to liquid, a conduit including a valve for withdrawing said liquid and isenthalpically expanding it to include a partially vaporized fraction, means for introducing said expanded liquid including said vapor fraction into the upper portion of said rectifying column for partially condensing said vapor fraction to liquid in said second condenser, means including vapor rising through said perforated contact plates for stripping low boiling impurities from liquid trickling down through said column, a receptacle in contact with the external portions of said first condenser for collecting and completely reboiling said liquid to vapor, a conduit connected laterally to said column above said first condenser to withdraw a portion of said reboiled vapor, means comprising a motor-driven valve interposed in said last-named conduit for regulating the flow in said conduit to maintain the vapor-to-liquid ratio in said column in excess of 0.700, a second heat exchanging means connected to receive the portion from said valve for heating said portion to around 1000 degrees Fahrenheit, a catalytic chamber connected to receive said heated portion from said second heat exchanging means and to purify said portion of hydrocarbon impurities by catalytic combustion, said catalytic chamber connected to said second heat exchanging means in countercurrent flow for cooling said purified portion to the saturation point, a third condenser connected to receive said portion from said second heat exchanging means for condensing said purified portion to a final liquid product, means connected to the upper portion of said rectification column for withdrawing the balance of the vapor excluding said portion and returning said balance to the main column of said commercial rectification system, and refrigeration means including a source of liquid nitrogen connected for evaporation in said second and third condensers and for cooling said first and second heat exchangers.

31. A system for converting commercially pure oxygen comprising at least about 0.25 mol percent of argon and having a residue of impurities which may include nitrogen, and hydrocarbons, to ultrapure oxygen comprising means directly connected to the reboiler of a commercial purification system for deriving a commercially pure oxygen feed stream comprising liquid and vapor fractions, a first condenser wherein said commercially pure oxygen feed stream is introduced, the liquid fraction thereof being evaporated, a first heat exchanger connected to receive the vapor feed stream from said first condenser and heat it up to substantially ambient temperature, means for compressing said feed stream to substantially three atmospheres pressure, said first heat exchanger being connected to receive the compressed feed stream and cool it down to substantially the saturation point, a first rectification column comprising a second and third condenser, said second condenser disposed in the lower portion of said column, said third condenser disposed in the upper portion of said column, and in excess of about 26 perforated contact plates disposed between said condensers, said second condenser connected to receive the saturated feed stream from said first heat exchanger for condensing said stream to liquid, a conduit for withdrawing said liquid, said conduit containing a valve for isenthalpically expanding said liquid to include a vapor fraction, means for introducing said expanded liquid including said vapor fraction into the upper portion of said rectifying column for partially condensing said vapor fraction to liquid in said third condenser, means including vapor rising through said perforated contact plates for stripping low boiling impurities from the liquid which trickles down through said column, a receptacle in external contact with said second condenser for collecting and reboiling said liquid, a conduit laterally disposed in said column above said second condenser, means including a motor-driven valve disposed in said conduit for withdrawing a measured portion of said vapor and a liquid fraction of high boiling impurities through said conduit to maintain the liquid-to-vapor ratio in said column in excess of 0.700, means connected to the top of said first rectification column for returning the balance of the vapor in said column to the reboiler of said commercial purification system after withdrawal of said measured portion, an auxiliary rectification column including fourth and fifth condensers disposed in the bottom and top respectively of said column and a plurality of perforated plates therebetween, means for introducing the vapor and liquid fractions from said motor-driven valve part-way up in said column wherein said liquid fraction flows over said perforated plates in countercurrent with rising vapor, said liquid becoming enriched in hydrocarbon impurities and stripped of oxygen.

a receptacle in the bottom of said column for receiving said liquid and reboiling the lower boiling components of said liquid, including oxygen, to vapor, means for withdrawing the liquid hydrocarbon residue from said receptacle, and valve means for withdrawing said ultrapure liquid oxygen product condensing in said fifth condenser from vapor rising to the top of said auxiliary column.

32. The combination in accordance with claim 31 wherein said means for controlling said motor-driven valve comprises an analyzer connected to receive and test the ultrapure product from said auxiliary rectification column, and a servo system responsive to the output of said analyzer to drive said motor-driven valve to open when said purity exceeds a certain preselected standard and to close when said purity falls below said preselected standard.

33. The combination in accordance with claim 31 wherein refrigeration is supplied by an internal nitrogen cycle separate from the cycle of said feed stream, means including said first condenser for condensing said nitrogen to liquid in a heat exchange with the evaporation of the liquid fraction in said feed stream, means for conveying said liquefied nitrogen to condensers in subsequent portions of the cycle of said feed stream for condensing said feed stream in a heat exchange with the evaporation of said liquid nitrogen, and means for conveying said evaporated nitrogen through heat exchange and compressor means in subsequent portions of the nitrogen cycle for compressing and cooling said compressed nitrogen in a countercurrent heat exchange with said evaporated nitrogen.

34. The combination in accordance with claim 31 wherein said auxiliary rectification column for removing hydrocarbon impurities is replaced by a catalytic combustion chamber connected to receive the effluent gases from said first rectification column and to purify the said gases of hydrocarbon impurities by catalytic combustion prior to introduction of said gases into a final condenser for producing a final purified liquid product.

35. The method of producing ultra high purity oxygen from a feed stream of commercially pure oxygen feed stock having low boiling impurities therein which comprises the steps of compressing said feed stream, cooling said compressed feed stream to the saturation point, condensing said feed stream to liquid, expanding said liquid thereby further cooling it, stripping said low boiling impurities from said liquid in a rectification column as a result of countercurrent contact with rising vapor, the pressure in said column being maintained at slightly above atmospheric pressure and the vapor-to-liquid ratio in said column being maintained in excess of about 0.700, reboiling the purified liquid and drawing off a portion of the purified vapor derived from said reboiling operation while returning the balance of said vapor including said impurities through a recycle path to rejoin said feed stream.

36. The method of producing ultrahigh purity oxygen from commercially pure oxygen feed stock about 99.7 percent pure containing a residue of low-boiling impurities which comprises in combination deriving a feed stream from a source of said commercially pure oxygen stock, reducing said feed stream to a saturated vapor, substantially completely condensing said saturated vapor feed stream to liquid, isenthalpically expanding said liquid to produce a cooled liquid stream having a slight vapor fraction, condensing the vapor fraction of said stream to liquid, stripping low boiling impurities from said liquid stream, including said condensed vapor fraction, by rectification in countercurrent with rising vapor in a rectification column, collecting said liquid in a pool after said rectification step, substantially completely reboiling said liquid in said pool to vapor, withdrawing a measured portion of said reboiled vapor which does not exceed about 20 mol percent of said feed stream, and after withdrawal of said measured portion returning the remainder of the vapor from the top of said column through a recycle path to merge with and become part of said feed stream.

References Cited
UNITED STATES PATENTS 2,514,391  7/1950  Haynes _____ 62—22 XR (Other references on following page)

UNITED STATES PATENTS

| | | | |
|---|---|---|---|
| 2,287,158 | 6/1942 | Yendall | 62—29 X |
| 2,526,996 | 10/1950 | Crawford | 62—13 X |
| 2,545,462 | 3/1951 | Haynes | 62—13 X |
| 2,762,208 | 9/1956 | Dennis | 62—40 X |
| 2,962,868 | 12/1960 | Dennis | 62—22 |
| 3,037,359 | 6/1962 | Knapp. | |
| 3,056,268 | 10/1962 | Grenier. | |
| 3,062,016 | 11/1962 | Dennis et al. | 62—22 |
| 3,169,845 | 2/1965 | Kornemann et al. | 62—22 X |
| 3,210,950 | 10/1965 | Lady | 62—13 X |

FOREIGN PATENTS

62–3866  6/1962  Japan.

NORMAN YUDKOFF, *Primary Examiner.*

V. W. PRETKA, *Assistant Examiner.*